Figure 1:
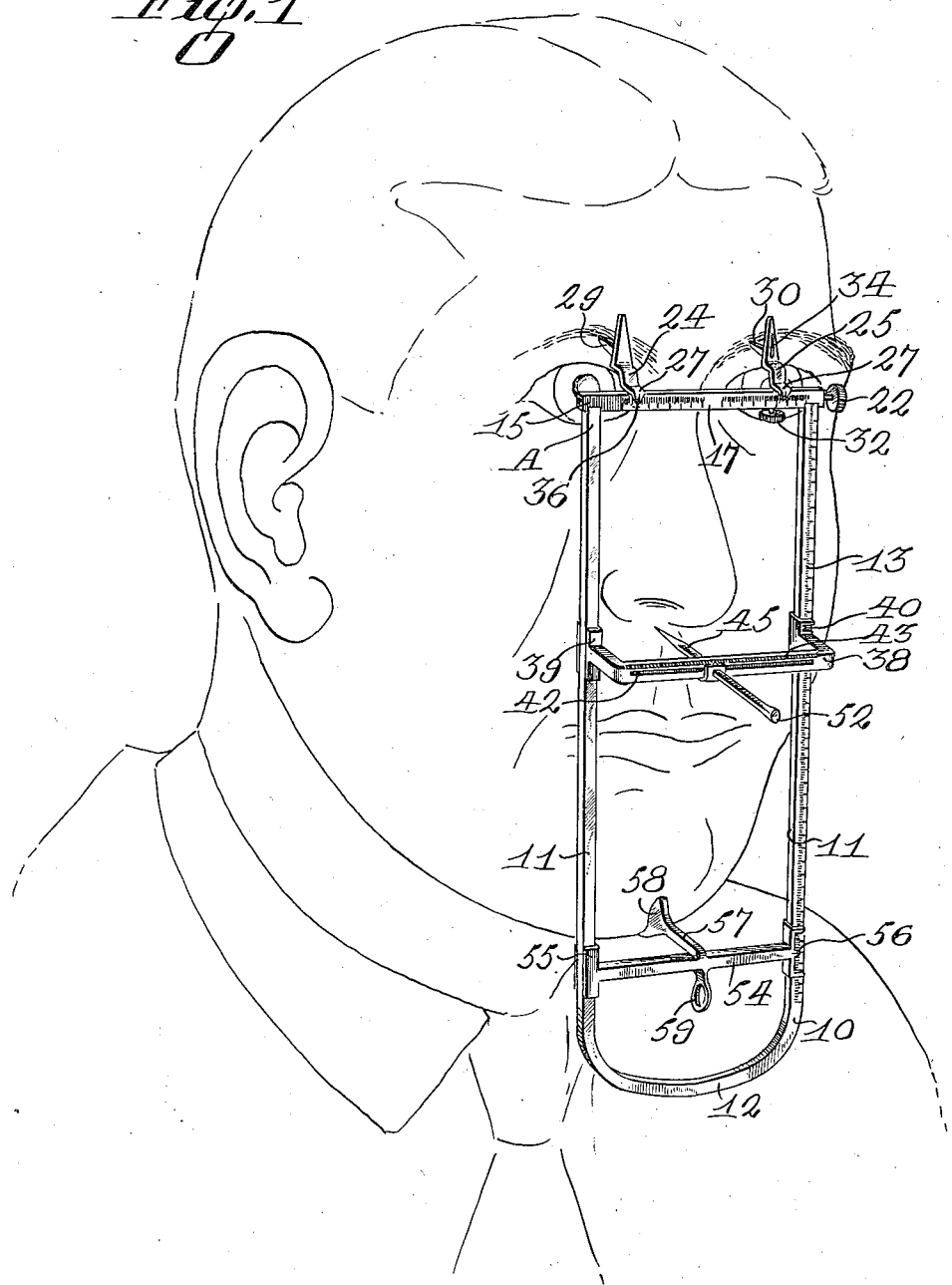

July 28, 1936.   R. BARIBEAU   2,048,989
MEASURING INSTRUMENT
Filed March 12, 1935   2 Sheets-Sheet 1

Inventor
Roméo Baribeau
By Raymond A. Robic
Attorney

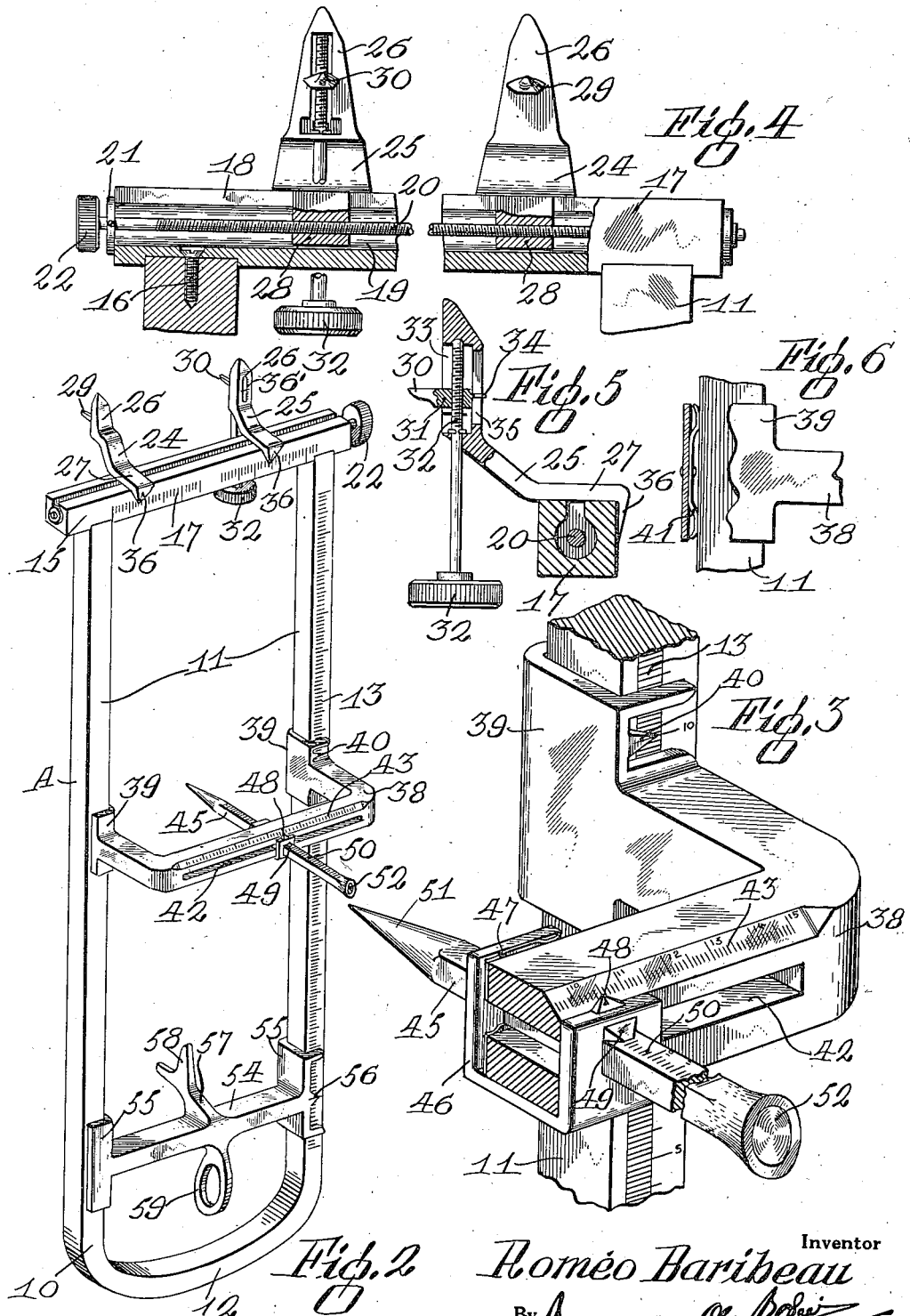

Patented July 28, 1936

2,048,989

UNITED STATES PATENT OFFICE 2,048,989

MEASURING INSTRUMENT

Roméo Baribeau, Levis, Quebec, Canada

Application March 12, 1935, Serial No. 10,679

1 Claim. (Cl. 33—174)

The present invention relates to measuring instruments and has reference to an instrument particularly adapted for measuring facial and dental forms and characteristics.

The objects of the present invention are the provision of an instrument of relatively simple construction which will enable accurate measurement of natural facial form and characteristics; accurate measurement of natural tooth forms and characteristics; accurate determination of deformation of the face or teeth; accurate determination of the position of natural teeth in relation to fixed cranial bone structures; will enable accurate recording, in permanent, efficient, compact card form, of the measurements of the face and teeth; will greatly facilitate accurate restoration of the natural dimensions after resorption due to the extraction of the teeth during the subsequent denture insertion; will greatly assist in the accurate relative positioning of the teeth in denture operations.

Other objects and advantages of the invention will become apparent as the description progresses.

In the accompanying drawings forming a part of this specification and in which like reference characters are employed to designate corresponding parts throughout the same:

Figure 1 is a perspective view showing the instrument applied in face measuring position on the head of a person, Figure 2 is a perspective view of the device removed, Figure 3 is an enlarged fragmentary perspective of the intermediate portion of the instrument, Figure 4 is an enlarged fragmentary longitudinal section through the upper end thereof, Figure 5 is a transverse section through one of the top positioning brackets, and Figure 6 is a fragmentary elevation, partly broken away, showing the construction of the slide structure.

Referring to the drawings, wherein for the purpose of illustration is shown a preferred embodiment of the invention, A generally designates the frame of the instrument which, in the example shown, is elongated and embodies a body section 10 bent in U-shaped form from a single metallic bar to provide a pair of parallel longitudinal side bars 11 and an arcuate bottom connecting bar 12. On the front face of one of the side bars 11 is marked a longitudinally extending graduated scale 13.

To the upper ends of the body section side bars 11 is connected a detachable transversely extending head bar 15 secured to the body section by screws 16. On the front face of the head bar is marked a graduated scale 17. In the top of the transverse bar 15 is formed a longitudinal slot 18 communicating with an enlarged through bore 19. Within the bore 19 is disposed a longitudinally extending screw 20 journalled in bearing rings 21 secured to the ends of the bar and having an actuating knob 22 secured on the outwardly projecting end portion. The screw 20 is preferably threaded so that one half is formed with right hand screw threads while the other half is formed with left hand threads, as shown at Figure 4.

On the top of the head bar 15 are mounted a pair of angular complementary brackets 24 and 25 adapted to provide frame positioning elements. Each of these brackets embodies an upstanding or longitudinally projecting portion 26 and a right angular portion 27 extending across the head bar. To the portion 27 of each bracket is connected a sleeve 28 interiorly screw threaded to engage the screw 20 and having a reduced neck portion extending through the slot 18. As will be noted from Figure 4, the sleeves of the respective brackets engage respectively the right and left hand threaded portions of the screw so that rotation of the knob 22 will enable simultaneous sliding adjustment of the brackets.

To the bracket 24 is connected a setting prong 29 projecting laterally from the upstanding part 26. To the complementary bracket 25 is connected a setting prong 30 projecting from a slide block 31 disposed to slide vertically in a channel 33 in the bracket and having threaded engagement with an actuating screw 32 journalled in the channel. The purpose of this adjustment is to insure, in case of unsymmetrical features, that the instrument is always held along the vertical axis of the face to be measured when one or the other of the pro-orbital point is lower or higher than the other. At the outer side of the slide block 31 is formed an outwardly projecting indicator finger 34 movable in a slot 35 in the bracket and adapted to indicate measurement in relation to a scale 36 formed on the front face of the bracket. At the extremity of the part 27 of each bracket is formed a right angular tapered indicator 36 adapted to move along the front face of the head bar in conjunction with the scale 17.

The body section 10 of the frame carries a bracket 38 slidably mounted thereon. This bracket is in the form of a U-shaped bar projecting outwardly of the frame and formed at the ends with a pair of slider channels 39 having slidable connection with the opposed side bars 11. One of the slider channels is provided, at the front, with a notch in which is formed a tapered indicator 40 disposed to designate the longitudinal position of the bracket relative to the longitudinal scale 13 on the frame. In order that the bracket may be frictionally held in set position and yet be capable of sliding adjustment with slight pressure, a spring bar 41 is attached to the inner side wall of one or both channels said bar being bent so that the ends are yieldingly pressed against the longitudinal bar of the frame, as shown to advantage at Figure 6. The front transversely extending bar of the U-shaped bracket 38 is formed with a longitudinal horizontally disposed slot 42 terminating short of the ends of the bar. The front upper corner of the bar is preferably bevelled and provided with a graduated measuring scale 43.

Within the slot 42 of the bracket 38 is fitted a measuring pin 45 assuming a right angle to the transverse bar of the bracket and adapted to assume a horizontal position when the measuring frame is in its normal approximately vertical position. The pin 45 is slidably connected with the bracket by means of a U-shaped metallic guide member 46 straddling the under part of the bracket and having openings in the front and rear side portions through which the non-circular shank of the pin is slidably fitted. To the interior face of the rear portion of the guide bracket 46 is connected a bar spring 47 disposed to yieldingly and frictionally engage the transverse portion of the bracket 38 so as to retain the pin and guide in any set position thereon. At the top of the front portion of the guide 46 is formed a tapered index 48 adapted to provide an indicator for the scale 43. At the front portion of the guide is also formed a tapered index 49 providing an indicator for a graduated scale 50 provided on the top face of the pin shank. The inner end of the pin 45 is preferably formed to provide a tapered point 51 while the outer extremity is formed with an enlarged head portion 52.

Below the slide bracket 38 the frame A carries a member 54 also slidable longitudinally on the body section, this member embodying a bar extending transversely between the side portions of the frame body and provided at the ends with slide channels 55 slidably engaging the side bars. One of the slide channels 55 is notched at the front and formed with a pointer 56 providing an indicator on the longitudinal frame scale 13. At the centre of the slide bar 54 is formed an inwardly and upwardly projecting arm 57 formed at the extremity with a crotch piece 58. To the lower side of the bar is connected a depending eye 59 adapted to enage convenient adjustment of the slide member.

In the application of the instrument as a device for measuring facial and dental forms, the instrument is placed upon the medial portion of the patient's face in such manner that the brackets 24 and 25 as well as the setting prongs 29 and 30 are in firm contact with definite unvarying cranium structure, preferably the supra orbital bones, preventing upward movement of the instrument. The member 54 is slidably adjusted on the frame A in order that the crotch piece 58 may be fitted firmly against the central portion of the chin, known as the symphysis, to hold the frame against upward or lateral movement. When thus positioned, the frame may be firmly held with the left hand while the readings noted on the transverse scale 17 and vertical scale 13 are recorded. Thereafter, the pin 45 is actuated by the right hand horizontally as well as vertically against the skin or the teeth of the patient and the dimensions shown on the scales 50, 43, and 13 duly recorded. The measurements thus taken will furnish accurate dimensions of the facial form including outline and features particularly subject to resorption or deformation and will also enable the measurement of dental forms.

The readings thus taken with the instrument may be retained as a convenient form of record which may be referred to when it is desired to verify the retention of the natural facial form or for the purpose of restoring the natural appearance of distorted features.

It is to be understood that the form of my invention herein shown and described is to be taken as a preferred example of the same and that various changes as to the shape, size and arrangement of parts may be resorted to without departing from the spirit of the invention or the scope of the subjoined claim.

Having thus described my invention, I claim:—

A measuring instrument of the character described, comprising a U-shaped frame lying in a plane, a graduated bar transversely across the upper arms of the frame, supra-orbital setting prongs movable longitudinally on said bar, a U-shaped outwardly extending bridge slidable longitudinally on the frame, a scale disposed to indicate the relative longitudinal position of the bridge, a horizontally disposed depth pin at right angles to the plane of the frame, means connecting the pin with the bridge so that the pin may be moved longitudinally and laterally, and a chin locating slide disposed on the frame below the pin supporting bridge and movable independently thereof.

ROMÉO BARIBEAU.